United States Patent [19]

Poqué

[11] 4,024,901
[45] May 24, 1977

[54] LOWER SIDEWALL REINFORCEMENT FOR PNEUMATIC TIRES

[75] Inventor: Dionysius Josef Poqué, Aachen, Germany

[73] Assignee: Uniroyal A.G., Aachen, Germany

[22] Filed: Sept. 8, 1975

[21] Appl. No.: 611,389

[30] Foreign Application Priority Data

Sept. 26, 1974 Germany .................. 7432386[U]

[52] U.S. Cl. .......................... 152/354; 152/362 R
[51] Int. Cl.² .................... B60C 9/02; B60C 15/06
[58] Field of Search ...... 152/354, 355, 356, 362 R, 152/362 CS

[56] References Cited

UNITED STATES PATENTS

| 3,028,903 | 4/1962 | Lessig | 152/362 R |
|---|---|---|---|
| 3,074,456 | 1/1963 | Neuville et al. | 152/354 |
| 3,115,179 | 12/1963 | Shepherd | 152/354 |
| 3,172,445 | 3/1965 | Boussu et al. | 152/354 |
| 3,480,065 | 11/1969 | Verdier | 152/354 |
| 3,500,890 | 3/1970 | Boileau | 152/354 |
| 3,557,860 | 1/1971 | Maiocchi | 152/362 R |
| 3,612,139 | 10/1971 | Marzocchi et al. | 152/362 R |
| 3,703,203 | 11/1972 | Simpson | 152/354 |
| 3,853,163 | 12/1974 | Mezzanotte et al. | 152/362 R |
| 3,904,463 | 9/1975 | Boileau | 152/354 |

*Primary Examiner*—Drayton E. Hoffman
*Attorney, Agent, or Firm*—Lawrence E. Sklar

[57] ABSTRACT

A lower sidewall construction for radial ply tires characterized by improved in-service stability and structural strength is disclosed. The tire includes first and second bead units, at least one radially extending carcass ply, the end portions of which are each turned up around one of the bead units, and a radially extending square-woven fabric reinforcing strip positioned between each of the bead units and the carcass ply. Each of the reinforcing strips extends throughout a major portion of the respective lower sidewall of the tire, the radially inward end of each of the reinforcing strips extending to the core of its corresponding bead unit and the radially outwardmost portion of each of the reinforcing strips being in direct contact with, and adhering to, the carcass ply.

19 Claims, 8 Drawing Figures

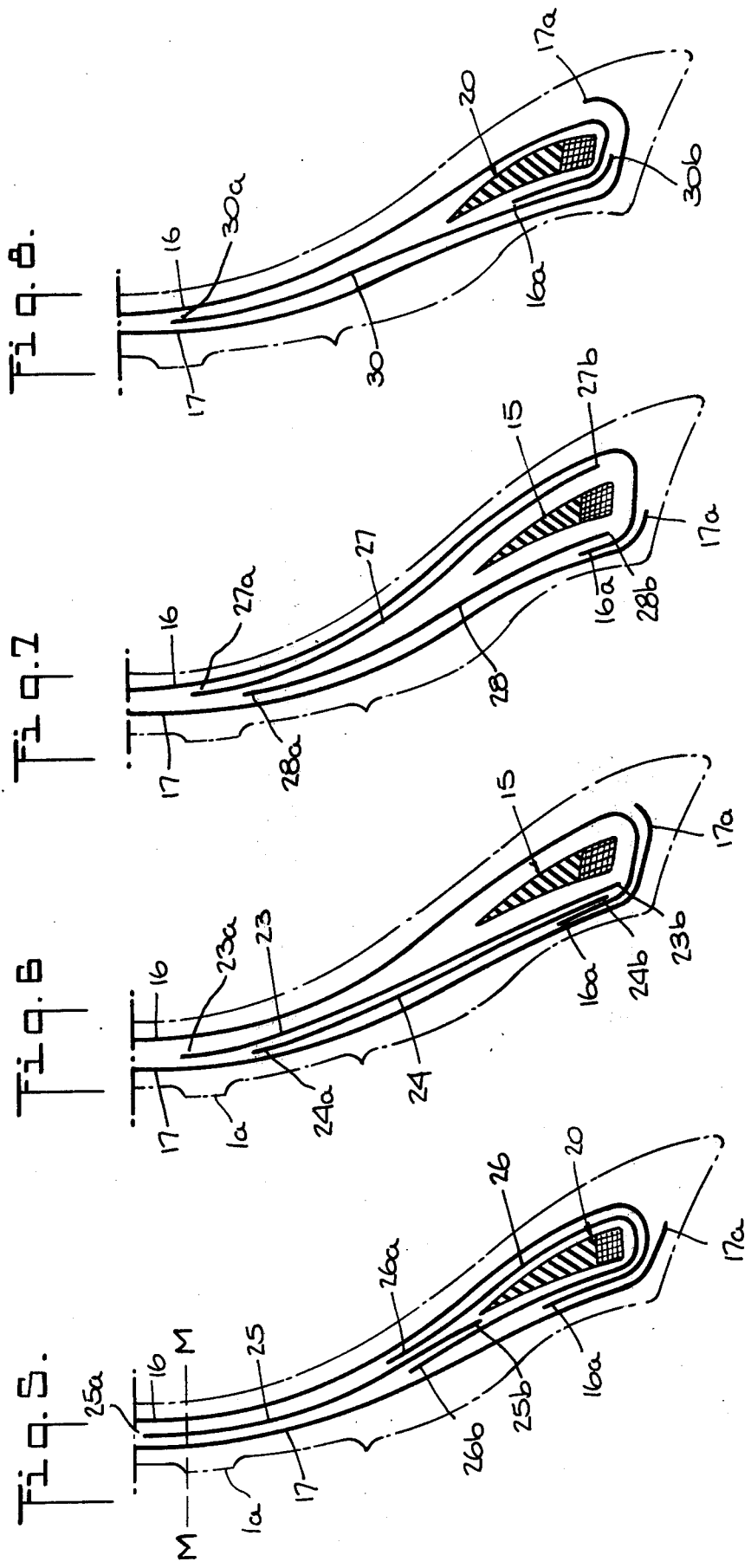

LOWER SIDEWALL REINFORCEMENT FOR PNEUMATIC TIRES

BACKGROUND OF THE INVENTION

This invention relates to radial ply pneumatic vehicle tires and more particularly to such tires having reinforcements in the regions of the beads and the lower sidewalls.

The expression "radial tires" and "radial ply tires" as commonly used in the pneumatic tire art may be said to include the various tire constructions having a carcass or body comprising one or more reinforcement plies of rubberized tire cords extending from bead to bead wherein the cords in each ply are substantially radial in orientation, i.e., the cords are oriented substantially normal to the beads and to the crown center-line of the tire. In a mono-ply tire the carcass or body cords normally have 90° bias angle, i.e., in the unshaped carcass they extend perpendicular to the planes of the beads. In a two-ply radial tire, the cords in each body ply are usually oriented at oppositely disposed small angles of up to 10° with respect to the perpendicular to the bead planes, in which case the respective body plies are said to have oppositely disposed bias angles of 80° or greater (but less than 90°). In four ply or heavier radial ply tire constructions similar opposed orientation of the cords in successive body plies is usually employed. All of these body or carcass constructions are contemplated within the scope and meaning of the expressions "radial" and "substantially radial" as used herein.

It is known that in radial ply carcass tires the beads and lower sidewall areas are the most delicate regions of the tire structure due to the considerable stresses to which they are subjected. This is due to the fact that the sidewalls of radial ply tires deform substantially in a vertical direction under load. The consequent repeated flexing of the lower tire sidewalls combined with the stresses imposed thereon result in premature deterioration of the lower sidewall regions and the beads. The phrase "lower sidewall region" is used here to mean that region of the tire which extends from the tire bead up to that point on the tire at which the width of the tire cross-section is a maximum, i.e., the mid-circumferential plane of the tire. The aforementioned deterioration of the tire is due both to, as aforestated, the detachment and rupture of the carcass plies in the lower sidewall region of the tire and due to friction between that region of the tire and the flange of the wheel rim on which the tire is mounted.

It is known in the radial ply tire art that, to minimize the aforenoted disadvantages, it is desirable to stiffen the bead regions of the tire. To this end the beads have been contsructed to include, in addition to the metal wire bead ring, and the carcass plies which are turned up about the ring, reinforcements of various kinds such as, for example, hard rubber fillers, which are generally triangular in cross-sectional configuration and which extend radially outward of the bead ring and by flippers which are made of rubberized tire cord fabric, have a tear drop shaped cross-sectional configuration and envelop the bead ring and bead filler. It is further known, in an attempt to overcome the aforenoted disadvantages, to further stiffen the bead regions of a radial ply tire by including one or more strips of radially extending rubberized cord fabric in the bead regions of the tires, as illustrated, for example, in U.S. Pat. No. 3,557,860.

The foregoing constructions are, however, not completely satisfactory in that they do not provide sufficient bonding between the tire bead unit and the carcass, they do not provide sufficient reinforcement for the lower sidewall region of the tire and, as a consequence of the foregoing, they do not provide a tire having the desired degree of stability.

SUMMARY OF THE INVENTION

It is, therefore, an important object of the present invention to provide an improved radial ply pneumatic vehicle tire construction by means of which the aforesaid drawbacks and disadvantages may be most efficaciously avoided.

It is a further object of this invention to provide a radial ply tire characterized by improved bonding between the bead units of the tire and the carcass thereof.

It is yet another object of the invention to provide a tire characterized by enhanced in-service stability.

It is still another object of this invention to provide a radial ply tire wherein the rigidity of the lower sidewall regions and the bead regions of the tire may be varied as desired.

It is still a further object of this invention to provide a radial ply tire construction whereby the frequency of breaks and ruptures in the lower sidewall regions of the tire, above the bead, may be decreased.

Generally speaking, and in accordance with one aspect of this invention the objectives of the present invention are attained by the provision of a pneumatic vehicle tire comprising first and second bead units, at least one radially extending carcass ply, the end portions of which are each turned up around one of said bead units, and a radially extending square-woven fabric reinforcing means positioned between each of said bead units and the carcass ply, each of the reinforcing means extending throughout a major portion of the respective lower sidewall of said tire, the radially inward end of each of the reinforcing means extending to its corresponding bead unit and the radially outwardmost portion of each of the reinforcing means being in direct contact with, and adhering to, the carcass ply.

BRIEF DESCRIPTION OF THE DRAWINGS

The foregoing and other objects and features of the present invention will be more clearly understood from the following description thereof when read in conjunction with the accompanying drawings, in which:

FIGS. 2–8 are each cross-sectional schematic plan views of the bead and lower sidewall area of a radial ply tire illustrating various alternative embodiments of the invention.

DESCRIPTION OF THE PREFERRED EMBODIMENT

Figure 1:
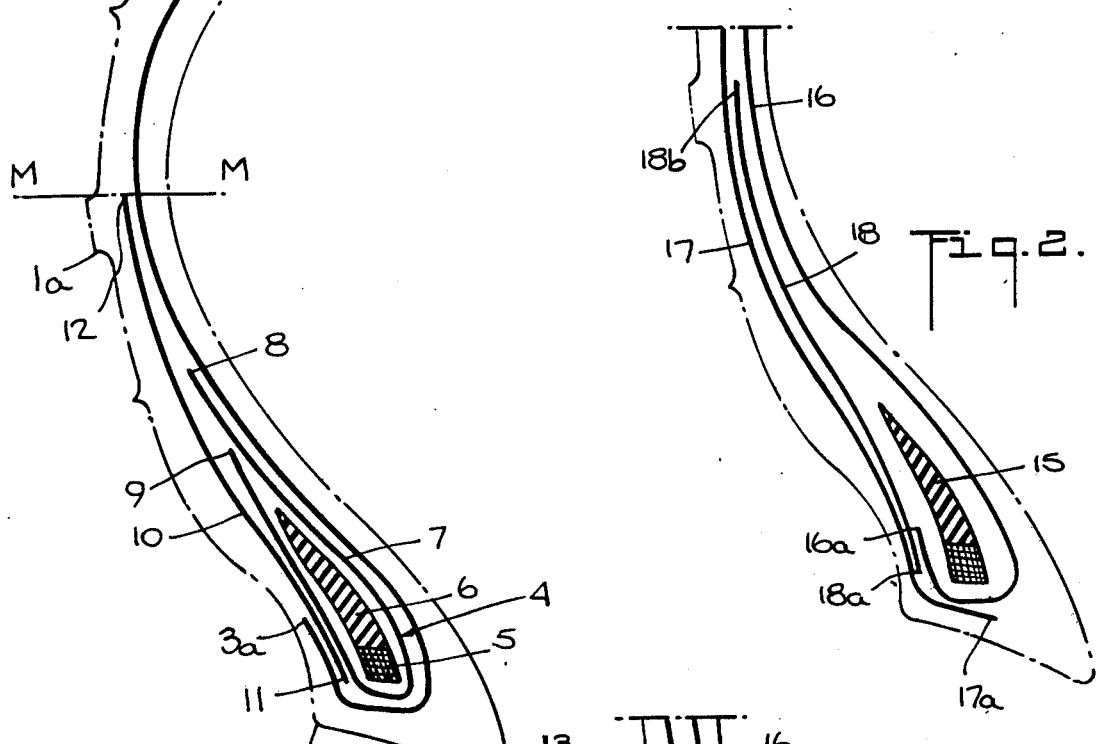
FIG. 1 illustrates a partial cross-sectional schematic plan view of a radial ply tire according to the invention.

Turning now to FIG. 1 there is illustrated a partial cross-sectional schematic plan view of a radial ply tire 1 including a tread 2 and a single radially extending carcass ply 3, it being understood of course that the tire is symmetrical about the median equatorial plane thereof, which plane is indicated at X-Y. A breaker or belt, here indicated at 100, which may be either mono-ply or multi-ply, is positioned radially outward of carcass ply 3 and radially inward of tread 2, such a breaker being conventional in the radial ply tire art. The end portion of carcass ply 3, indicated at 3a, is turned up around a bead unit 4, which bead unit includes a bead core 5 of metal wire, which core generally has a radial extent of approximately one-half inch, a hard rubber bead filler 6, which filler generally has a radial extent of approximately one and one-half inches, and a bead flipper 7. The bead filler 6 has a generally triangular cross-section, the base of which is in contact with the bead core 5, the filler extending radially outwardly and tapering to an apex. Bead flipper 7, which may be made of rubberized woven or weftless tire cord material similar to that used for carcass ply 3, has a generally tear drop shaped cross-sectional configuration. The continuous end portion of flipper 7 extends radially inwardly of bead core 5 and the two ends, indicated at 8 and 9, at the radially outward, discontinuous portion of flipper 7 extend radially outwardly of the radially outwardmost portion of filler 6. It is noted that the ends 8 and 9 of flipper 7 extend radially outwardly to differing extents so as not to provide a "hinge" point of structural weakness. The major portion of carcass ply 3 (as differentiated from that portion of carcass ply 3 in the region of end 3a) extends axially inwardly of bead unit 4 and the end 3a of ply 3 extends axially outwardly of bead unit 4.

The tire 1 further includes means for reinforcing the bead and lower sidewall area of the tire and for improving the bonding between the bead unit 4 and the carcass ply 3 which reinforcing means is a strip of rubberized, square-woven fabric 10, for example, nylon, its radially inwardmost end being indicated at 11 and its radially outwardmost end being indicated at 12. By the term lower sidewall region of the tire is meant, as previously noted, that portion of the sidewall which extends radially inward from the axially widest portion of the tire, indicated at M—M, which, in conventional tire construction coincides with the midcircumferential plane of the tire and at which point is also conventionally located a curb rib, indicated at 1a, to the radially inwardmost portion of the bead zone, the axially inwardmost end of which zone is defined by bead toe 13 and the axially outwardmost end of which zone is defined by bead heel 14. Reinforcing strip 10 is of square-woven fabric, that is, fabric comprised of warp and weft cords extending orthogonally to each other. The fabric strip 10, as is true of all the reinforcing strips to be subsequently discussed with regard to FIGS. 2–8, is so cut and/or positioned in the tire that both the warp and weft cords extend at 45° angles relative to the radially extending cords of carcass ply 3 in the area of the bead units. Reinforcing fabric strip 10 extends radially inwardly to a point such that it is at least one inch radially inward of the radially outwardmost portion of the bead unit and preferably to the radial elevation of bead core 5. The strip 10 extends radially outwardly over at least a major portion, i.e., more than one-half, of the lower sidewall of the tire 1 and preferably over the entire lower sidewall of the tire to the region indicated at M-M. The fabric strip 10 may have a maximum radial extent of approximately 110% of the radial extent of the lower sidewall, which is measured from M-M to the radially inwardmost region of the bead zone and it may thus extend radially outwardly even somewhat beyond the mid-circumferential plane indicated at M-M.

In the embodiment illustrated in FIG. 1 the fabric strip 10 has a radial extent almost equal to that of the lower sidewall, the fabric strip 10 terminating at its radially inwardmost end at the level of bead core 5 and extending radially outwardly to the end 12 of the strip which is essentially at the level of plane M-M. The radially inwardmost portion of reinforcing fabric strip 10 is positioned axially outwardly of bead unit 4 and axially inwardly of the turned up portion of carcass ply 3 and the radially outwardmost portion of fabric strip 10, that is, that portion extending radially outwardly of end 8 of flipper 7, is in direct contact with, and adheres to, the major portion of carcass ply 3. The adherence of reinforcing fabric strip 10 to carcass ply 3 results in superior bonding between the bead unit 4 and the carcass ply 3 and therefore in improved in-service stability of the tire. The presence of strip 10 also results in an increase in the rigidity of the sidewall which in turn results both in a diminution of the likelihood of lower sidewall ruptures due to flexing of the sidewall of the radial ply tire and in still further improved in-service stability of the tire. Moreover, because a square-woven fabric is utilized rather than, for example, a rubberized weftless cord fabric, the reinforcing strip 10 will absorb forces equally during both braking and acceleration. To this end the square-woven fabric strip 10 may have substantially similar or identical moduli of elasticity and tensile strengths in both the warp and weft directions. The instant structure further provides means for graduating the stiffness of the lower sidewall of the tire in a desired manner by, for example, varying the point to which the fabric extends in the radially outward direction, the farther outward in a radial direction the fabric strip 10 extends resulting in a more rigid lower sidewall and increased bonding between strip 10 and carcass ply 3. The graduation of the rigidity of the lower sidewall of the tire may be further accomplished by the incorporation of, or the dispensation with, bead flipper 7. Thus, construction of the instant tire without a bead flipper will result in a less rigid lower sidewall while simultaneously resulting in the bonding, over an increased radial extent, between fabric 10 and ply 3. Further, the rigidity of the lower sidewall may further be controlled by the radial extent to which the ends 8 and 9 of bead flipper 7 extend radially outward toward the mid-circumferential plane of the tire indicated at M-M.

Figure 2:
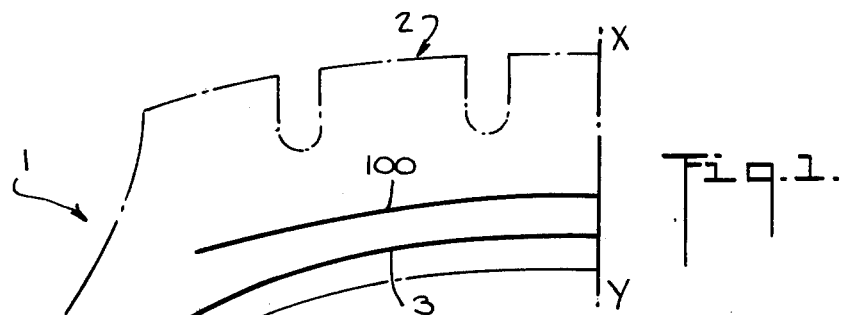

Turning now to FIGS. 2 through 8, each of which is a cross-sectional plan view of the lower sidewall region of the tire illustrated in FIG. 1 and wherein the same numerals are utilized to indicate corresponding portions of the tire structure, it is seen that in FIG. 2 a carcass including two radially extending plies, 16 and 17, is illustrated. Ply 16 is axially inward of ply 17 and the major portion of ply 16, that is, the portion other than the turned up portion, passes axially inwardly of bead unit 15 and is turned up around the bead unit, terminating at end 16a which end is axially outward of bead unit 15. Ply 17 is axially outward of ply 16 and the major portion of ply 17, that is, the portion other than the turned up portion, is positioned axially outwardly of the bead unit 15 and ply 17 terminates, at end 17a, radially inward of bead unit 15.

It is here appropriate to note that in the remaining embodiments to be discussed, as well as in the embodiment of FIG. 1, either one or two carcass plies may be utilized. It is further noted that for the sake of illustrative convenience bead flippers enveloping the bead cores and fillers will not be illustrated. Therefore, in the remaining illustrated embodiments the numeral 15 will be used to indicate a bead unit including only a bead core and a bead filler whereas the numeral 20 will be utilized, as for example in FIGS. 5 and 8, to indicate a bead unit incorporating a bead flipper as well as a bead core and a bead filler. It will be understood of course that in each of the illustrated embodiments a bead unit may or may not include a bead flipper, as desired, in much the same manner as a single or multi-ply carcass may be utilized as noted above.

Turning once again to the embodiment illustrated in FIG. 2, it is seen that the rubberized square-woven fabric reinforcing strip indicated at 18 extends from the region of the bead core, that end of strip 18 being indicated at 18a, to the mid-circumferential plane of the tire, that end of fabric 18 being indicated at 18b. The fabric 18 is positioned axially outward of both bead unit 15 and the turned up portion of carcass ply 16 and axially inwardly of carcass ply 17. The fabric strip 18 is thus, over much of the portion thereof which is radially outward of the bead unit, in direct contact with, and adhered to, both carcass plies 16 and 17.

Figure 3:
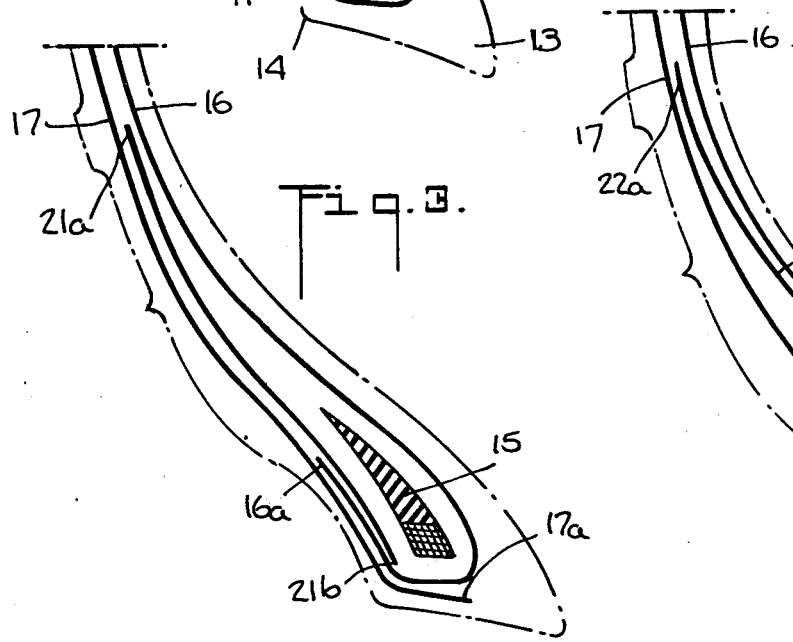

Turning now to FIG. 3 it is seen that the rubberized square-woven fabric reinforcing strip of the invention is indicated at 21 and has a radially inwardmost termination indicated at 21b and a radially outwardmost termination indicated at 21a. The embodiment illustrated in FIG. 3 is similar to that illustrated in FIG. 2 with the exception that the radially inwardmost portion of fabric 21 is positioned axially inwardly of both the turned up portion of ply 16 and the major portion of ply 17 and is axially outward only of bead unit 15.

Figure 4:
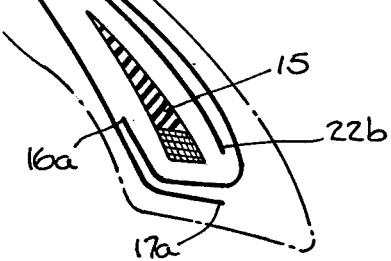

Turning now to FIG. 4 it is seen that the square-woven reinforcement strip is indicated at 22 with its radially inwardmost and outwardmost portions being indicated at 22b and 22a, respectively. In this embodiment strip 22 is positioned axially inwardly of bead unit 15 and axially outwardly of the major portion of carcass ply 16. Radially outwardly of the bead unit 15 the fabric strip 22 is, as is true of the other illustrated embodiments 2 through 8, adhered firmly to plies 16 and 17.

Turning now to FIG. 5 it will be seen that the fabric reinforcing strip is indicated at 25 and extends radially outwardly and inwardly to terminations indicated at 25a and 25b, respectively. The radially inwardmost portion of strip 25 is positioned and embedded between the radially outwardmost ends of a bead flipper 26, which ends are indicated at 26a and 26b. In this embodiment reinforcing strip 25 does not extend radially inwardly to the region of the core of the bead unit 20 as is the case in the other illustrated embodiments and the structure illustrated in FIG. 5 also supplies the least rigidity to the lower sidewall of a tire of all the embodiments illustrated. It may be seen that in the embodiment illustrated in FIG. 5 reinforcing strip 25 is virtually an extension of the reinforcement of the tire bead unit 20 in a radially outward direction. It is here appropriate to note that in this embodiment strip 25 extends radially outwardly beyond the mid-circumferential plane of the tire, indicated at M—M. Thus, notwithstanding the fact that the radially inwardmost end 25b of strip 25 need not extend more than one inch radially inward of the radially outwardmost portion of flipper 26, the strip 25 nevertheless has a radial extent which is greater than one-half of the radial extent of the lower sidewall of the tire.

Turning now to the embodiment of the tire structure illustrated in FIG. 6, it is seen that the fabric reinforcing means includes two radially extending strips of square-woven fabric, which strips are indicated at 23 and 24.

The radially outwardmost ends and the radially inwardmost ends of the strips 23 and 24 are indicated at 23a and 24a, respectively, and at 23b and 24b, respectively. The radially inwardmost ends of strips 23 and 24 extend to the area of the core of bead unit 15 and are positioned axially outwardly thereof and axially inwardly of both the turned up end portion 16a of carcass ply 16 and of the major portion of carcass ply 17. Strip 23 extends both radially inwardly and radially outwardly of the radially inwardmost and outwardmost ends, respectively, of strip 24, and only portion 23a of strip 23 extends radially outwardly as far as the mid-circumferential plane of the tire.

Turning now to FIG. 7, there is illustrated an embodiment of the tire in which the reinforcing means includes two radially extending strips of rubberized square-woven fabric. In this embodiment however, as differentiated from the embodiment illustrated in FIG. 6, strip 28 is positioned axially outwardly of the core of bead unit 15 and axially inwardly of both the turned up end portion 16a of carcass ply 16 and of the major portion of carcass ply 17, whereas fabric strip 27 is positioned axially inwardly of the core of bead unit 15 and axially outwardly of the major portion of carcass ply 16.

With regard to the embodiments illustrated in FIGS. 6 and 7 it is appropriate to note that these two embodiments provide the greatest rigidity for the lower sidewall and bead regions of a tire all of the embodiments disclosed herein. It is also appropriate to here note that the two strips of reinforcing fabric illustrated in each embodiment, that is, strips 23 and 24 illustrated in FIG. 6 and strips 27 and 28 illustrated in FIG. 7 may have different characteristics with respect to their modulus of elasticity and/or the tensile strength of the filaments, thereby providing a further opportunity to permit the variance or graduation of the rigidity provided to the lower sidewall and bead regions.

Turning now to the embodiment illustrated in FIG. 8, it will be noted that this embodiment is similar to that illustrated in FIG. 2 with the exception that the fabric reinforcing strip here indicated at 30 extends, at its radially inward extremity, indicated at 30b, to a point radially inward of bead unit 20 rather than to a point radially parallel with the bead core as in the other embodiments illustrated, with the exception of the embodiment illustrated in FIG. 5. The embodiment illustrated in FIG. 8 may appropriately be utilized when it is desired to anchor the radially inner portion of reinforcement fabric 30 in the area of the bead sole and, in such event, it may also be desirable for the axially outwardmost carcass ply, 17, to extend radially inwardly of the core of bead unit 20 and beyond, and be turned up around the bead unit 20 as indicated at 17a.

It will be understood that the foregoing description of the preferred embodiments of the present invention is for purposes of illustration only, and that the various structural and operational features as herein disclosed are susceptible to a number of modifications and changes none of which entails any departure from the spirit and scope of the present invention as defined in the hereto appended claims.

What is claimed is:

1. A pneumatic vehicle tire comprising:
   first and second bead units;
   at least one radially extending carcass ply, the respective end portions of said carcass ply being turned up to the axially outward sides of said bead units and extending radially outward to a point radially inward of the radially outwardmost portion of the corresponding bead unit, and the respective major portions of said carcass ply being positioned axially inwardly of said bead units; and a radially extending square-woven fabric reinforcing means positioned between each of said bead units and said carcass ply, each of said reinforcing means extending throughout a major portion of the respective lower sidewall of said tire, wherein the radially inwardmost portion of each of said respective reinforcing means extends to its corresponding bead unit and is positioned axially outwardly of said bead unit and axially inwardly of the respective turned up end portion of said carcass ply, and wherein the radially outwardmost portion of each of said reinforcing means is in direct contact with, and adheres to, said carcass ply.

2. A pneumatic vehicle tire according to claim 1 wherein each bead unit comprises a bead core and a bead filler positioned adjacent to, and extending radially outward of, said bead core.

3. A pneumatic vehicle tire according to claim 2 wherein each bead unit further comprises a bead flipper of rubberized cord fabric enveloping the bead core and bead filler, the flipper having a tear drop shaped cross-section wherein the continuous end of the flipper extends radially inward of the bead core and the two discontinuous ends of the flipper extend radially outward beyond the radially outwardmost portion of the bead filler.

4. A penumatic vehicle tire according to claim 2 wherein the radially inwardmost portion of each of said respective reinforcing means extends to its corresponding bead core.

5. A pneumatic vehicle tire according to claim 4 wherein said square-woven fabric reinforcing means comprises warp cords and weft cords which extend orthogonally relative to each other, said warp and weft cords each extending at a 45° angle relative to the radially extending cords of said carcass ply in the area of said bead units.

6. A pneumatic vehicle tire comprising:
first and second bead units;
a first radially extending carcass ply, the respective end portions of said first carcass ply being turned up to the axially outward sides of said bead units and extending radially outward to a point radially inward of the radially outwardmost portion of the corresponding bead unit, and the respective major portions of said first carcass ply being positioned axially inwardly of said bead units;
a radially extending square-woven fabric reinforcing means positioned adjacent each of said bead units and said first carcass ply, each of said reinforcing means extending throughout a major portion of the respective lower sidewall of said tire, wherein the radially inwardmost portion of each of said respective reinforcing means extends to its corresponding bead unit and is positioned axially outwardly both of said bead units and of said respective turned up end portion of said carcass ply; and
a second radially extending carcass ply, the respective major portions of which are positioned axially outwardly both of said bead units and of said reinforcing means and the respective end portions of which extend radially inwardly of said bead units.

7. A pneumatic vehicle tire according to claim 6 wherein each bead unit comprises a bead core and a bead filler positioned adjacent to, and extending radially outward of, said bead core.

8. A pneumatic vehicle tire according to claim 7 wherein each bead unit further comprises a bead flipper of rubberized cord fabric enveloping the bead core and bead filler, the flipper having a tear drop shaped cross-section wherein the continuous end of the flipper extends radially inward of the bead core and the two discontinuous ends of the flipper extend radially outward beyond the radially outwardmost portion of the bead filler.

9. A pneumatic vehicle tire according to claim 7, wherein the radially inwardmost portion of each of said respective reinforcing means extends to its corresponding bead core.

10. A pneumatic vehicle tire comprising
first and second bead units;
at least one radially extending carcass ply, the respective end portions of said carcass ply being turned up to the axially outward sides of said bead units and extending radially outward to a point radially inward of the radially outwardmost portion of the corresponding bead unit, and the respective major portions of said carcass ply being positioned axially inwardly of said bead units; and
a radially extending square-woven fabric reinforcing means positioned between each of said bead units and said carcass ply, each of said reinforcing means extending throughout a major portion of the respective lower sidewall of said tire, wherein each of said reinforcing means comprises at least two radially extending strips of square-woven fabric, the radially inwardmost ends of each of said two strips extending to their respective bead unit and being positioned axially outwardly of their respective bead unit and axially inwardly of the respective turned up end portion of said carcass ply, one of said two strips extending both radially inwardly and radially outwardly beyond the radially inwardmost and outwardmost ends of the other of said two strips.

11. A pneumatic vehicle tire according to claim 10 wherein said one radially extending strip of square-woven fabric is positioned axially inwardly of said other of said two strips.

12. Apneumatic vehicle tire according to claim 10 wherein each bead unit comprises a bead core and a bead filler positioned adjacent to, and extending radially outward of, said bead core.

13. A pneumatic vehicle tire according to claim 12 wherein each bead unit further comprises a bead flipper of rubberized core fabric enveloping the bead core and bead filler, the flipper having a tear drop shaped cross-section wherein the continuous end of the flipper extends radially inward of the bead core and the two discontinuous ends of the flipper extend radially outward beyond the radially outwardmost portion of the bead filler.

14. A pneumatic vehicle tire according to claim 12 wherein the radially inwardmost ends of each of said two strips of square-woven fabric extend to their respective bead core.

15. A pneumatic vehicle tire comprising:
first and second bead units;
at least one radially extending carcass ply, the respective end portions of said carcass ply being turned up to the axially outward sides of said bead units and extending radially outward to a point radially inward of the radially outermost portion of the corresponding bead unit, and the respective major portions of said carcass ply being positioned axially inwardly of said bead units; and a radially extending square-woven fabric reinforcing means positioned between each of said bead units and said carcass ply, each of said reinforcing means extending throughout a major portion of the respective lower sidewall of said tire, wherein each of said reinforcing means comprises at least two radially extending strips of square-woven fabric, the radially innermost ends of each of said two strips extending to their respective bead unit, one of said two strips being positioned axially outwardly of its respective bead unit and axially inwardly of the respective turned up end portion of said carcass ply and the other of said two strips being positioned axially inwardly of its respective bead unit and axially outwardly of its respective major portion of said carcass ply.

16. A pneumatic vehicle tire according to claim 15 wherein each bead unit comprises a bead core and a bead filler positioned adjacent to, and extending radially outward of, said bead core.

17. A pneumatic vehicle tire according to claim 16 wherein each bead unit further comprises a bead flipper of rubberized cord fabric enveloping the bead core and bead filler, the flipper having a tear drop shaped cross-section wherein the continuous end of the flipper extends radially inward of the bead core and the two discontinuous ends of the flipper extend radially outward beyond the radially outermost portion of the bead filler.

18. A pneumatic vehicle tire according to claim 16 wherein the radially innermost ends of each of said two strips of square-woven fabric extend to their respective bead core.

19. A pneumatic vehicle tire comprising:

first and second bead units, each bead unit comprising a bead core, a bead filler positioned adjacent to, and extending radially outward of, said bead core, and a bead flipper of rubberized cord fabric enveloping the bead core and bead filler, the flipper having a tear drop shaped cross-section wherein the continuous end of the flipper extends radially inward of the bead core and the two discontinuous ends of the flipper extend radially outward beyond the radially outermost portion of the bead filler;

at least one radially extending carcass ply, the end portions of which are each turned up around one of said bead units; and a radially extending square-woven fabric reinforcing means positioned between each of said bead units and said carcass ply, each of said reinforcing means extending throughout a major portion of the respective lower sidewall of said tire, the radially inward end of each of said reinforcing means being positioned between, and extending radially inward of, the two radially outward ends of said flipper and the radially outermost portion of each of said reinforcing means being in direct contact with, and adhering to, said carcass ply.

* * * * *